United States Patent Office 3,151,166
Patented Sept. 29, 1964

3,151,166
METHOD FOR PREPARING COLOR STABLE ETHANOLAMINES
John G. Milligan, Austin, Tex., assignor to Jefferson Chemical Company, Inc., Houston, Tex., a corporation of Delaware
No Drawing. Filed Sept. 12, 1960, Ser. No. 55,185
5 Claims. (Cl. 260—584)

This invention relates to a method for the preparation of color stable ethanolamines. More particularly, this invention relates to an improved method for the preparation of ethanolamines from ethylene oxide and ammonia in order to provide color stable ethanolamine products.

Ethanolamines such as monoethanolamine, diethanolamine and triethanolamine can be prepared by the reaction of ammonia with ethylene oxide. The reaction may be characterized as a condensation reaction which may be conducted, for example, at temperatures within the range of about 50° to 150° C. and at pressures within the range of about 0 to 100 p.s.i.g. The principal components of the reaction mixture are water, ammonia, monoethanolamine, diethanolamine and triethanolamine. The reaction is preferably conducted in the presence of molar excess of ammonia and therefore, the reaction product will normally contain ammonia. In addition, minor quantities of reaction by-products of unknown composition may be formed during the reaction.

Although ethanolamines are comparatively heat stable under normal conditions, they are subject to thermal decomposition at elevated temperatures. Thus, a monoethanolamine boiling range fraction may tend to thermally decompose at temperatures as low as about 160° C. and significant decomposition will tend to occur if the monoethanolamine fraction is maintained at temperatures in excess of about 165° C. for more than a few minutes. In like manner, diethanolamine and triethanolamine boiling range fractions, though somewhat more stable than monoethanolamine, may tend to decompose thermally at temperatures as low as about 180° C. and will thermally decompose to a significant extent if maintained at a temperature in excess of 200° C. for more than a few minutes. Although it has not been definitely established, it is believed that decomposition, at least initially, is primarily attributable to the minor quantities of impurities that are present.

If thermal decomposition of an ethanolamine fraction occurs to even a minor extent, discoloration of the product will occur. This is highly objectionable. Therefore, in order to minimize color formation, it is normally desirable to fractionate an ethanolamine product obtained by the reaction of ethylene oxide with ammonia at temperatures of not more than aboue 200° C. As a consequence, vacuum distillation is frequently employed in the fractionation of such ethanolamine products.

While product work-up of this matter is generally satisfactory, the results have not been entirely satisfactory, particularly with respect to the diethanolamine and triethanolamine products. Thus, the diethanolamine and triethanolamine fractions will frequently be of an off-yellow color when freshly prepared or will tend to develop a color on standing. For example, ethanolamines are considered to be of satisfactory color stability when they do not darken in color after being heated for 18 hours at 80° C. This is commonly referred to as the "stability color" test. As indicated, the di and triethanolamines prepared by the thermal condensation of ammonia with ethylene oxide will frequently fail to pass this test.

It has been discovered in accordance with the present invention that color stable ethanolamines can be prepared which will pass the stability color test when the condensation reaction is conducted in the presence of an ammonium salt of a strong acid.

For the purpose of this application, a strong acid may be defined as an acid having an ionization constant greater than 0.01 in pure water at 25° C. A preferred class of strong acids are acids having an ionization constant of about 0.05 or more in pure water at 25° C.

The starting materials to be used in preparing color stable ethanolamines include ammonia, ethylene oxide and an ammonium salt of a strong acid. It is normally preferable to utilize an excess of ammonia (e.g. from about 1.5 to about 10 mols of ammonia per mol of ethylene oxide) and to utilize only a minor amount of the ammonium salt of a strong acid (e.g. from about 0.005 to about 0.05 mol per mol of ethylene oxide). However, the desirable result is not obtained when less than about 0.005 mol of ammonium salt is used per mol of ethylene oxide.

The reaction conditions to be utilized in conducting the reaction include a temperature, pressure and contact time sufficient to obtain a desired conversion of the ammonia and ethylene oxide to ethanolamines. Thus, by way of example, temperatures within the range of about 50° to 200° C., pressures within the range of about 0 to 100 p.s.i.g. and reaction times within the range of about 0.5 to 5 hours may be employed.

Among the ammonium salts of strong acids that may be used are salts such as ammonium sulfate, ammonium chloride, ammonium nitrate, ammonium benzene sulfonate, etc. Preferably, the ammonium salt is added directly. However, since an excess of ammonia is normally present in the reaction zone, it is possible to add a strong acid in order to form the ammonium salt of the strong acid in situ or to add to the reaction zone a compound which is reactive with ammonia to give the desired ammonium salt. Thus, for example, compounds such as sulfuric acid, hydrochloric acid, nitric acid, benzene sulfonic acid, etc., or easily ammonolyzed organic halides such as ethylene dichloride may be added. In this situation, of course, the amount that is added should be sufficient to provide the desired concentration of the desired ammonium salt in the reaction mixture.

The products of the reaction may be worked up in any desired manner. Preferably, the desired ethanolamine products are recovered from the reaction mixture by fractionation conducted in a manner to provide a high purity monoethanolamine fraction and a heavier fractionation consisting essentially of diethanolamine and triethanolamine.

The process may be practiced in a continuous or batch-wise manner, as desired.

The invention will be further illustrated by the following specific examples which are given by way of illustration and not as limitations of the scope of this invention. Where parts are given, they are parts by weight.

*Example 1*

Add about 100 parts of an aqueous 28% solution of ammonia to an autoclave and heat the solution to about 100° C. Next add about 30 parts of ethylene oxide over about a 5-minute period and heat the resultant reaction mixture at 100° C. for about 2 hours. At the end of this time, cool the reaction mixture to room temperature, vent the autoclave and recover the liquid reaction products. Add the liquid reaction mixture to a still provided with an agitator, a thermometer, heating means and a vacuum source. While maintaining the apparatus at atmospheric pressure, heat the pot to a temperature sufficient to provide a head temperature at the top of the column to a temperature of 165° C. in order to distill off the ammonia and water. Recover the aqueous ammonia solution, then drop the pressure at the head of the column to about 25 mm. of mercury and recover a monoethanolamine fraction at a head temperature of 165°/25 mm. Next adjust the head temperature to 188° C./3 mm., in order to obtain a fraction consisting essentially of a mixture of diethanolamine and triethanolamine; the pressure being lowered from 25 mm. to 3 mm. as needed during the recovery of this fraction in order to maintain a pot temperature of about 200° C.

In a representative experiment conducted in this fashion, the fraction consisting essentially of diethanolamine and triethanolamine was yellow in color.

*Example 2*

Repeat Example 1 with but one exception. Add about 0.3 part of ammonium sulfate to the autoclave together with the ethylene oxide. In this case, a colorless fraction consisting essentially of diethanolamine and triethanolamine was obtained.

*Example 3*

Repeat Example 2, but in this instance use only 0.03 gram of ammonium sulfate. The diethanolamine-triethanolamine fraction has a pale yellow color.

*Example 4*

Repeat Example 2, but in this case substitute ammonium chloride for the ammonium sulfate. The diethanolamine-triethanolamine fraction is colorless.

*Example 5*

Repeat Example 2, but in this instance use ethylene dichloride (which reacts with the ammonia to form ammonium chloride) for the ammonium sulfate. Again, the diethanolamine-triethanolamine fraction is colorless.

*Example 6*

Repeat Example 2, but in this instance substitute ammonium acetate for the ammonium sulfate. The diethanolamine-triethanolamine fraction has a pronounced yellow color.

*Example 7*

Repeat Example 2, but in this instance use sodium hydroxide in place of the ammonium sulfate. The diethanolamine-triethanolamine fraction has a pronounced yellow color.

*Example 8*

Repeat Example 2, but in this instance use sodium acetate instead of the ammonium sulfate. The diethanolamine-triethanolamine fraction has a pronounced yellow color.

*Example 9*

Repeat Example 2, but in this instance use sodium chloride instead of the ammonium sulfate. The diethanolamine-triethanolamine fraction has a pronounced yellow color.

What is claimed is:

1. A method for preparing color stable ethanolamines from ethylene oxide and ammonia which consists of reacting each mol of ethylene oxide with from about 1.5 to 10 mols of ammonia in the presence of from about 0.05 to about 0.005 mol of an ammonium salt of a strong acid having an ionization constant at 25° C. in pure water greater than 0.01, under reaction conditions including a temperature within the range of 50° to about 200° C., a pressure within the range of about 0 to about 100 p.s.i.g., and reaction time within the range of about 0.5 to about 5 hours to provide a reaction mixture containing monoethanolamine, diethanolamine and triethanolamine, distilling color stable monoethanolamine from said reaction mixture at a temperature of not less than 165° C. and distilling color stable diethanolamine and color stable triethanolamine from said reaction mixture at a temperature of not mre than 200° C.

2. A method as in claim 1 wherein the ammonium salt is selected from the group consisting of ammonium sulfate, ammonium chloride, ammonium nitrate and ammonium benzene sulfonate.

3. A method which comprises the steps of reacting ethylene oxide with from about 1.5 to about 10 mols of ammonia and from about 0.05 to 0.005 mol of an ammonium salt of a strong acid per mol of ethylene oxide under reaction conditions including a temperature within the range of about 50° to 200° C., a pressure within the range of about 0 to 100 p.s.i.g. and a reaction time within the range of about 0.5 to 5 hours to provide a reaction mixture containing monoethanolamine, diethanolamine and triethanolamine, and fractionataing said reaction mixture into color stable monoethanolamine, diethanolamine and triethanolamine distillate fractions at a temperature less than 200° C., said strong acid having an ionization constant in pure water at 25° C. of more than about 0.05 and said ammonium salt being added to the reaction mixture as such.

4. A method as in claim 3 wherein the added ammonium salt is an ammonium salt selected from the group consisting of ammonium sulfate, ammonium chloride, ammonium nitrate and ammonium benzene sulfonate.

5. A method which comprises the steps of reacting ethylene oxide with from about 1.5 to about 10 mols of ammonia and from about 0.05 to 0.005 mol of ammonium chloride per mol of ethylene oxide under reaction conditions including a temperature within the range of about 50° to 200° C., a pressure within the range of about 0 to 100 p.s.i.g., and a reaction time within the range of about 0.5 to 5 hours to provide a reaction mixture containing monoethanolamine, diethanolamine and triethanolamine and fractionating said reaction mixture into color stable monoethanolamine, diethanolamine and triethanolamine distillate fractions at a temperature less than 200° C., the ammonium chloride being formed in situ by the addition of ethylene dichloride to the reaction mixture.

References Cited in the file of this patent

UNITED STATES PATENTS

| | | |
|---|---|---|
| 2,058,791 | Hoche | Oct. 27, 1936 |
| 2,074,339 | Miles | Mar. 23, 1937 |
| 2,823,236 | Lowe et al. | Feb. 11, 1958 |

FOREIGN PATENTS

| | | |
|---|---|---|
| 474,507 | Canada | June 12, 1951 |
| 704,226 | Great Britain | Feb. 17, 1954 |